(12) United States Patent
Yao et al.

(10) Patent No.: US 11,796,155 B2
(45) Date of Patent: Oct. 24, 2023

(54) BACKLIGHT ASSEMBLY AND DISPLAY DEVICE

(71) Applicants: Beijing BOE Optoelectronics Technology Co., Ltd., Beijing (CN); BOE TECHNOLOGY GROUP CO., LTD., Beijing (CN)

(72) Inventors: Jianfeng Yao, Beijing (CN); Qiuli Wang, Beijing (CN); Lei Chen, Beijing (CN); Zhiqiang Wang, Beijing (CN); Xin Ma, Beijing (CN); Chuan Sun, Beijing (CN); Xinyu Wang, Beijing (CN); Dingyang Tan, Beijing (CN)

(73) Assignees: Beijing BOE Optoelectronics Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 50 days.

(21) Appl. No.: 17/765,071

(22) PCT Filed: May 20, 2021

(86) PCT No.: PCT/CN2021/094810
§ 371 (c)(1),
(2) Date: Mar. 30, 2022

(87) PCT Pub. No.: WO2022/001459
PCT Pub. Date: Jan. 6, 2022

(65) Prior Publication Data
US 2022/0373161 A1    Nov. 24, 2022

(30) Foreign Application Priority Data

Jun. 29, 2020   (CN) .......................... 202010605273.4

(51) Int. Cl.
G02F 1/1335     (2006.01)
F21V 9/30       (2018.01)
F21Y 113/10     (2016.01)

(52) U.S. Cl.
CPC .......... *F21V 9/30* (2018.02); *G02F 1/133607* (2021.01); *G02F 1/133614* (2021.01); *F21Y 2113/10* (2016.08)

(58) Field of Classification Search
CPC ......... G02F 1/113603; G02F 1/133607; G02F 1/133609; G02F 1/133611;
(Continued)

(56) References Cited

U.S. PATENT DOCUMENTS

| 2012/0057326 A1 | 3/2012 | Zheng et al. |
| 2016/0097889 A1* | 4/2016 | Kim ........................ G02B 6/005 362/606 |

(Continued)

FOREIGN PATENT DOCUMENTS

| CN | 201672441 U | 12/2010 |
| CN | 101936489 A | 1/2011 |

(Continued)

OTHER PUBLICATIONS

China Patent Office, CN202010605273.4 First Office Action issued on May 16, 2022.

*Primary Examiner* — Sean P Gramling
(74) *Attorney, Agent, or Firm* — HOUTTEMAN LAW LLC

(57) ABSTRACT

There are provided a backlight assembly (1) and a display device, the backlight assembly (1) includes a light source substrate (10), a microstructure film layer (30) and a backlight film material layer (20); the backlight film material layer (20) is located on a light outgoing side of the light source substrate (10), the microstructure film layer (30) is provided between the light source substrate (10) and the backlight film material layer (20), the microstructure film layer (30) includes a light transmission layer (301) and a microstructure region (302); the microstructure region (302) is provided at an edge position of the microstructure film layer (30).

20 Claims, 8 Drawing Sheets

(58) Field of Classification Search
CPC .......... G02F 1/133614; F21V 9/30–38; F21V 13/08; F21V 13/14
See application file for complete search history.

(56) References Cited

U.S. PATENT DOCUMENTS

| | | | |
|---|---|---|---|
| 2016/0116663 | A1 | 4/2016 | Hong et al. |
| 2019/0317367 | A1* | 10/2019 | Hong ................ G02F 1/133611 |
| 2021/0033260 | A1* | 2/2021 | Chung .............. G02F 1/133606 |
| 2022/0075229 | A1* | 3/2022 | Walker ............. G02F 1/133603 |

FOREIGN PATENT DOCUMENTS

| | | | |
|---|---|---|---|
| CN | 105301836 | A | 2/2016 |
| CN | 106287407 | A | 1/2017 |
| CN | 106292055 | A | 1/2017 |
| CN | 106970490 | A | 7/2017 |
| CN | 108072998 | A | 5/2018 |
| CN | 109143687 | A | 1/2019 |
| CN | 208399860 | U | 1/2019 |
| CN | 109407409 | A | 3/2019 |
| CN | 109686240 | A | 4/2019 |
| CN | 110515241 | A | 11/2019 |
| CN | 210626832 | U | 5/2020 |
| JP | 2007114587 | A | 5/2007 |

* cited by examiner

BACKLIGHT ASSEMBLY AND DISPLAY DEVICE

CROSS-REFERENCE TO RELATED APPLICATION

The present application claims the priority of Chinese Patent Application No. 202010605273.4 filed on Jun. 29, 2020, the contents of which are incorporated herein by reference as if fully set forth herein.

TECHNICAL FIELD

The present disclosure relates to the field of display technology, and in particular to a backlight assembly and a display device.

BACKGROUND

With the continuous development of display control technology, many direct-type backlight display devices gradually begin to adopt a control technology of local dimming to realize local lighting of the backlight assembly, thereby effectively reducing the power consumption of displaying of the screen. The technology of local dimming can divide the backlight assembly into multiple regions, and adjust the brightness of each region of the backlight assembly for displaying according to display contents. Compared with an edge-type backlight design, a better color contrast can be achieved and a purpose of energy saving can be achieved.

In practical applications, blue light emitting diodes (LEDs) are often used as a direct-type backlight source. By exciting a quantum dot film, red light and green light are generated, and the red light and the green light are combined with the blue light passing through the quantum dot film to form white light. Moreover, the longer the optical path of the light in the quantum dot film is, the more red light and green light are excited. It should be understood that if the brightness and color of various positions of the outgoing backlight are tested, the brightness/color at a certain backlight test point is formed by superposition of the light emitted by the LED near the test point and the light emitted by other surrounding LEDs. However, for the edge of the backlight, since no adjacent LEDs excite the quantum dot film to form a superposition of chromaticity, the overall effect will be bluish. Therefore, the edge of the backlight appears blue, causing uneven chromaticity of an image being displayed, thus influencing the display effect.

SUMMARY

Embodiments of the present disclosure provide a backlight assembly and a display device to solve at least the problem of uneven chromaticity of a bluish edge of an image displayed by an existing backlight display device.

In order to solve the above-mentioned problem, the present disclosure provides a backlight assembly, including:
  a light source substrate, a microstructure film layer and a backlight film material layer;
  where the backlight film material layer is located on a light outgoing side of the light source substrate, and contains red quantum dots and green quantum dots;
  the microstructure film layer is provided between the light source substrate and the backlight film material layer, and includes a light transmission layer and a microstructure region; the microstructure region is provided at an edge position of the microstructure film layer; the microstructure film layer is configured to change, at the edge position, an outgoing angle of all or part of backlight passing through the microstructure region, so that all or part of the backlight passing through the microstructure region is deflected from a direction perpendicular to an edge where the microstructure region is located and is refracted away from a center of the microstructure film layer.

In some implementations, the light source substrate is a direct-type light source substrate.

In some implementations, the source substrate includes a circuit substrate and blue light chips provided at intervals on the circuit substrate; orthographic projections of the blue light chips on a plane where the circuit substrate is located are all located within an orthographic projection of the microstructure film layer on the plane where the circuit substrate is located.

In some implementations, a cross section of the microstructure region in a direction perpendicular to the edge of the microstructure film layer is at least one right triangle; where a first leg of the right triangle is located on the light transmission layer, and a second leg of the right triangle is provided at a position away from the center of the microstructure film layer in the direction perpendicular to the edge where the microstructure region is located.

In some implementations, the at least one right triangle includes two or more right triangles, and the right triangles are provided in contact with each other.

In some implementations, the at least one right triangle includes two or more right triangles, and the right triangles are provided at equal intervals, or, the intervals between the right triangles are gradually increased in a direction from the edge to the center of the microstructure film layer.

In some implementations, a cross section of the microstructure region in a direction perpendicular to the edge of the microstructure film layer is at least one right trapezoid; where a long side of the right trapezoid is located on the light transmission layer, and a right-angled side of the right trapezoid is provided at a position away from the center of the microstructure film layer in the direction perpendicular to the edge where the microstructure region is located.

In some implementations, the at least one right trapezoid includes two or more right trapezoids, and the right trapezoids are provided in contact with each other; where short sides of the right trapezoids have a same length.

In some implementations, the at least one right trapezoid includes two or more right trapezoids, and the right trapezoids are provided in contact with each other; where lengths of short sides of the right trapezoids are gradually increased in a direction from the edge to the center of the microstructure film layer.

In some implementations, the backlight film material layer includes a red-and-green light reflection film layer and a quantum dot layer provided in sequence in a light outgoing direction; where, the quantum dot layer includes red quantum dots and green quantum dots; the red-and-green light reflection film layer is configured to reflect red light and green light.

In some implementations, the red-and-green light reflection film layer also serves as the light transmission layer.

In some implementations, the microstructure region includes a material of ultraviolet photosensitive resin, and/or the light transmission region includes a material of polyethylene terephthalate.

In order to solve the above-mentioned problem, the present disclosure further provides a display device including the above-mentioned backlight assembly.

Compared with the related art, the present disclosure has the following advantages.

In the embodiments of the present disclosure, the backlight assembly includes a light source substrate, a microstructure film layer and a backlight film material layer; the backlight film material layer is located on a light outgoing side of the light source substrate, and the microstructure film layer is provided between the light source substrate and the backlight film material layer; the microstructure film layer includes a light transmission layer and a microstructure region; the microstructure region is provided at the edge position of the microstructure film layer. In the embodiments of the present disclosure, the combination of the microstructure region and the light transmission layer can change, at the edge position, an outgoing angle of all or part of backlight passing through the microstructure region, so that all or part of the backlight passing through the microstructure region is deflected from a direction perpendicular to the edge where the microstructure region is located and is refracted away from a center of the microstructure film layer, thereby increasing the optical path of the backlight with a changed outgoing angle when passing through the backlight film material layer, exciting more red light and green light, and thus solving the problem of uneven chromaticity of a bluish edge of the backlight during full screen displaying.

BRIEF DESCRIPTION OF DRAWINGS

FIG. 7 is a schematic partial cross-sectional view of the microstructure film layer shown in FIG. 5a;

DETAIL DESCRIPTION OF EMBODIMENTS

Figure 1:
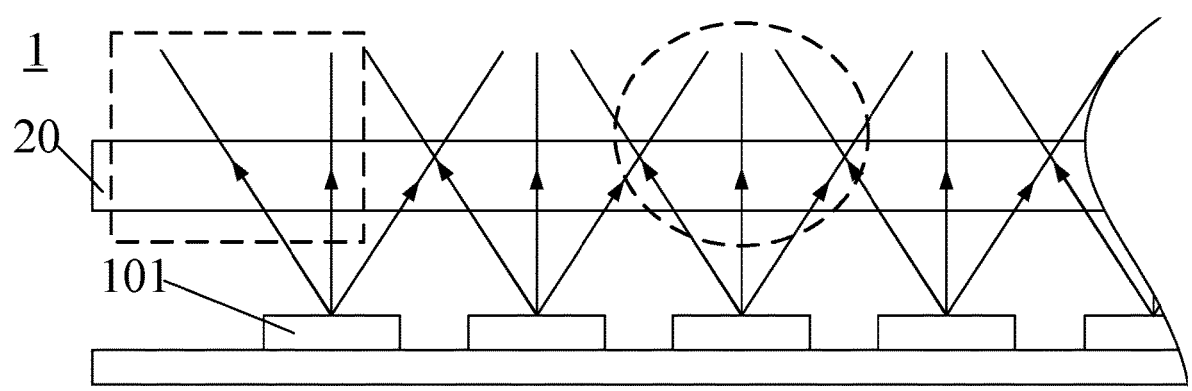
FIG. 1 is a schematic diagram illustrating light rays of an existing display device when a full screen thereof is lit.

In order to make purposes, technical solutions and advantages of the embodiments of the present disclosure clearer, the technical solutions of the embodiments of the present disclosure will be clearly and thoroughly described below with reference to the accompanying drawings of the embodiments of the present disclosure. Obviously, the described embodiments are some, but not all, embodiments of the present disclosure. Based on the described embodiments of the present disclosure, all other embodiments obtained by those of ordinary skill in the art without creative efforts fall within the protection scope of the present disclosure.

Unless otherwise defined, technical or scientific terms used herein should have the ordinary meaning as understood by one of ordinary skill in the art to which the present disclosure belongs. Words "first", "second" and the like used in the specification and claims of the present disclosure do not denote any order, quantity or importance, but are only used to distinguish different components. Words "comprising" or "including" or the like mean that the elements or things appearing before the word encompass the elements or things recited after the word and their equivalents, but do not exclude other elements or things. Words "inner", "outer", "upper", "lower", etc. are only used to indicate the relative positional relationship, and when the absolute position of the described object changes, the relative positional relationship may change accordingly.

It should be noted that the dimensions and shapes of the figures in the accompanying drawings do not reflect the actual scale, and are only intended to illustrate the contents of the present disclosure. Moreover, the same or similar reference numerals refer to the same or similar elements or elements having the same or similar functions throughout.

FIG. 1 shows a schematic diagram illustrating light rays of the backlight assembly of an existing display device when the full screen thereof is lit. As shown in FIG. 1, when displaying a full-white image, for most of the display region in the middle, the light therein is a mixture of the blue light emitted by the blue light chip 101 which directly faces the display region and the red and green light emitted by the quantum dots in the backlight film material layer 20 which are excited by the blue light, and a relatively small amount of blue light emitted by adjacent blue light chips 101 (i.e., adjacent to the blue light chip 101 which directly faces the display region) and the red and green light from the backlight film material layer 20 excited by the relatively small amount of blue light, referring to the elliptical dashed-line region in FIG. 1. Since the red and green light excited by the blue light emitted from the adjacent blue light chips 101 serve as a supplement, most of the display region in the middle will be displayed in white. However, for the edge of the display region, the light therein is a mixture of the blue light emitted by the blue light chip 101 at the edge and the red and green light excited by the blue light emitted by the blue light chip 101 at the edge, and a relatively small amount of blue light emitted by adjacent blue LED chips 101 (i.e., adjacent to the blue light chip 101 at the edge) and the red and green light which are excited by the relatively small amount of blue light, referring to the rectangular dashed-line region in FIG. 1; compared with most of the display region in the middle, there are fewer adjacent blue light chips at the edge of the display region, thus the proportion of red and green light is lower. Therefore, when the existing display device displays a full-white image, the edge of the image on the existing display device will appear bluish, that is, the problem of uneven chromaticity of the image occurs.

In view of the above problem in the related art, a backlight assembly and a display device in the embodiments of the present disclosure are proposed to solve at least the problem of uneven chromaticity of a bluish edge of the image during full screen displaying. Specifically, the present disclosure provides a backlight assembly, including: a light source substrate, a microstructure film layer and a backlight film material layer; where the backlight film material layer is located on a light outgoing side of the light source substrate, and contains red quantum dots and green quantum dots; the microstructure film layer is provided between the light source substrate and the backlight film material layer, and includes a light transmission layer and a microstructure region; the microstructure region is provided at an edge position of the microstructure film layer; the microstructure film layer is configured to change, at the edge position, an outgoing angle of all or part of backlight passing through the microstructure region, so that all or part of the backlight passing through the microstructure region is deflected from a direction perpendicular to an edge where the microstructure region is located and is refracted away from a center of the microstructure film layer.

In some implementations, the light source substrate is a direct-type light source substrate.

Figure 2:
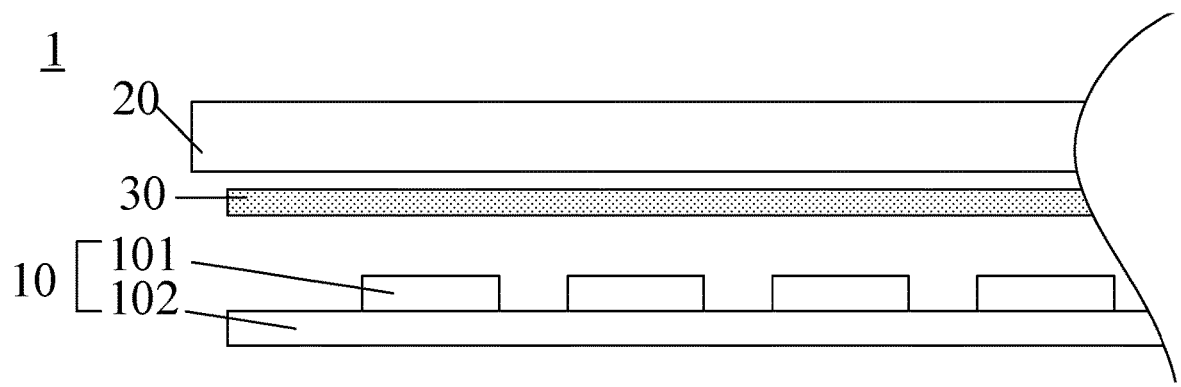
FIG. 2 is a schematic cross-sectional view of a structure of a backlight assembly according to an embodiment of the present disclosure.

FIG. 2 is a schematic diagram of a structure of a backlight assembly according to an embodiment of the present disclosure. The backlight assembly 1 includes a light source substrate 10, a backlight film material layer 20 and a microstructure film layer 30. The backlight film material layer 20 is located on a light outgoing side of the microstructure film layer 30; the backlight film material layer 20 contains red quantum dots and green quantum dots. The microstructure film layer 30 is located on a light outgoing side of the light source substrate 10, and is provided between the light source substrate 10 and the backlight film material layer 20. It should be understood that the geometry and size of the microstructure film layer 30 are determined by the geometry and size of the display region of the display device.

In an implementation, the direct-type light source substrate 10 includes a circuit substrate 102 and blue light chips 101 provided at intervals on the circuit substrate 102.

Figure 3A:
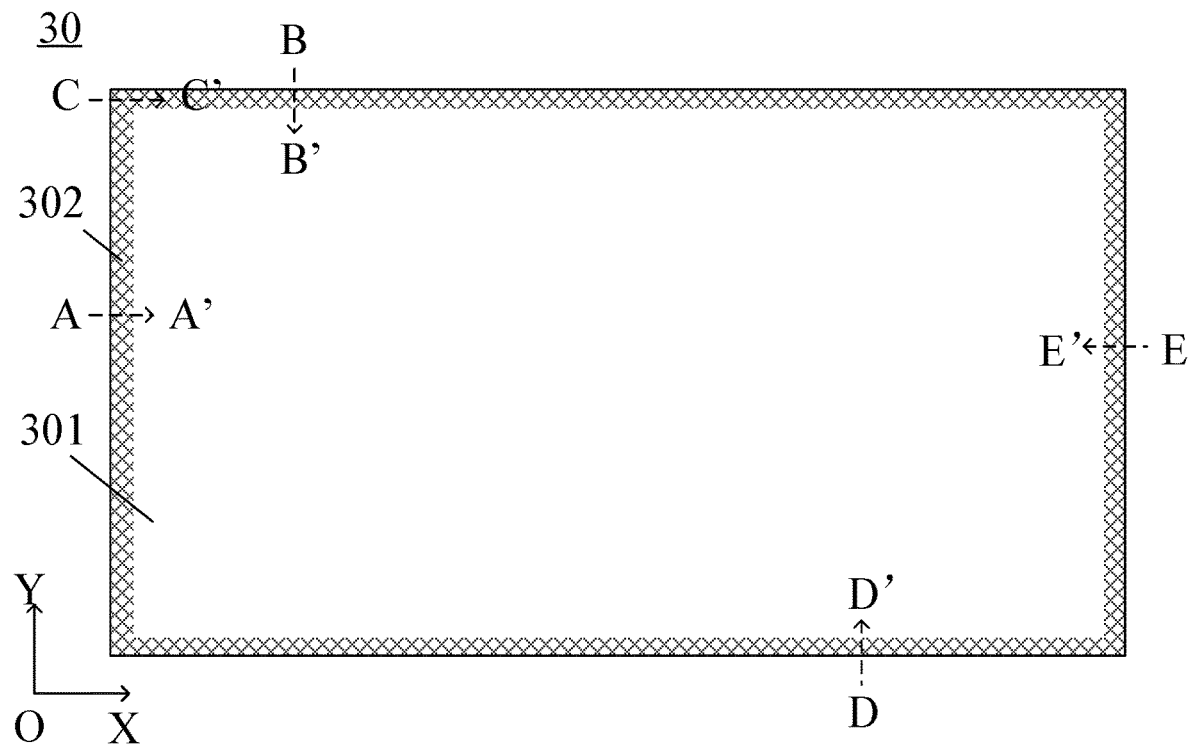
FIG. 3a is a schematic top view of a microstructure film layer according to an embodiment of the present disclosure.
Figure 3B:
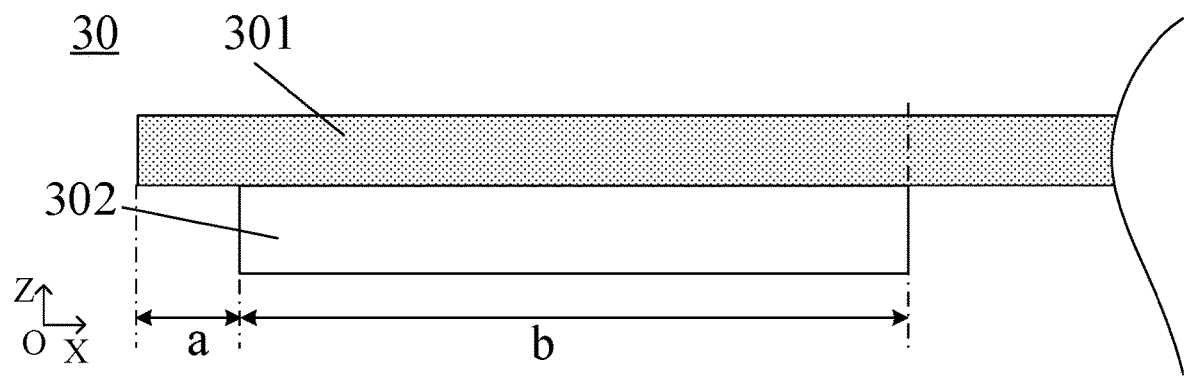
FIG. 3b is a schematic cross-sectional view of a structure shown in FIG. 3a taken along a direction of A→A' according to an embodiment of the present disclosure.

For example, as shown in FIG. 3b which is a schematic cross-sectional view taken along a direction of A→A' shown FIG. 3a, orthographic projections of all blue light chips 101 on a plane where the circuit substrate 102 is located are located within an orthographic projection of the microstructure film layer 30 on the plane where the circuit substrate 102 is located. The microstructure film layer 30 includes a light transmission layer 301 and a microstructure region 302. The microstructure region 302 may be located on a side of the light transmission layer 301 close to the direct-type light source substrate 10, and in contact with the light transmission layer 301. Referring to FIG. 3a, the microstructure region 302 is located at a position of microstructure film layer 30 near the edge thereof, and is distributed continuously in all edge regions of the microstructure film layer 30. In some implementations, the blue light chips 101 each are a blue light emitting diode.

For example, when the display region of the display device is rectangular, the microstructure region 302 is distributed continuously in four edge regions of the microstructure film layer 30; for example, when the display region of the display device is circular, the microstructure region 302 is continuously distributed in a ring shape at positions near the edge of the microstructure film layer 30.

When the display region of the display device is rectangular, referring to FIG. 3b, the microstructure region 302 has a width of b. In some implementations, the edge of the microstructure region 302 coincides with the edge of the microstructure film layer 30; in some implementations, in consideration of the convenience of the process, there is a width (i.e., distance) of a between the edge of the microstructure region 302 and the edge of the microstructure film layer 30 in the X-direction, where a $\leqslant 0.1$ mm.

It should be understood that, when the display region of the display device is rectangular, referring to FIG. 3a, the schematic cross-sectional views taken along directions of B→B', D→D', and F→F' each are the same as the schematic cross-sectional view taken along the direction of A→A', but the width of a may be varied depending on the processing technology. Therefore, the embodiments enumerated below all take the cross section taken along the direction of A→A' as an example.

It should be understood that, for four corner regions of the microstructure film layer 30, there may be situations where microstructure regions 302 in different directions intersect; in such case, each corner may be filled with the microstructure region 302 in any direction.

For example, when a bluish region at an edge of backlight has a width of m, the width of the microstructure region 302 is designed to be equal to b, so that a+b is approximately equal to m, where "approximately equal to" may be defined as: $0.5 \text{ m} \leqslant (a+b) \leqslant 1.5 \text{ m}$. In some implementations, $0.8 \text{ m} \leqslant (a+b) \leqslant 1.2 \text{ m}$. In some implementations, a+b=m. For example, for setting an actual product, the relationship between a+b and m may be set so that the bluishness of the edge of the backlight can be improved to be within an acceptable range.

Figure 4A:
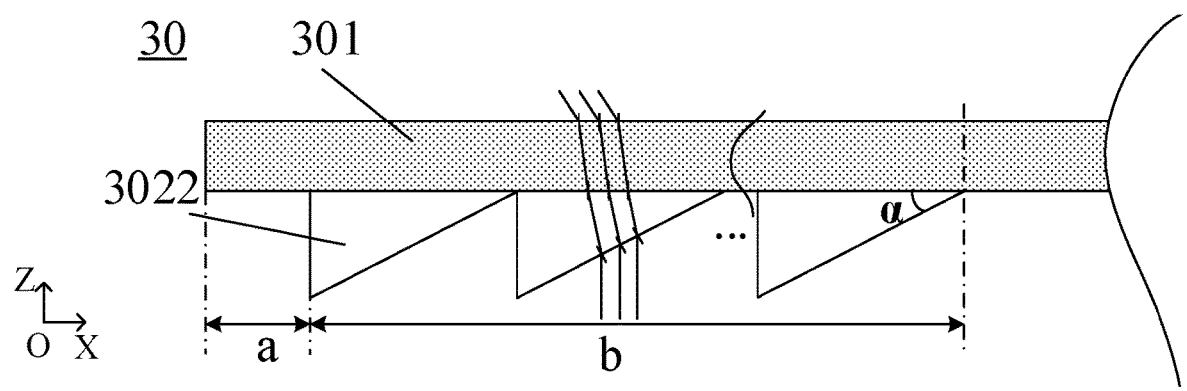
FIG. 4a is a schematic cross-sectional view of a microstructure film layer according to an embodiment of the present disclosure.

In some implementations, referring to FIG. 4a, which shows a specific structure of the microstructure region 302 in the cross section taken alone the direction of A→A' shown in FIG. 3a. It should be noted that the cross section taken along the direction of A→A' may correspond to any position of the edge where A→A' shown in FIG. 3a is located, but do not include corner positions at which the microstructure regions 302 in different directions intersect. First microstructures 3022 in the microstructure region 302 present right triangles in the cross section taken along the direction of A→A', and are continuously arranged in the X direction, and the number of the first microstructures 3022 is k. For each right triangle, the included angle between the hypotenuse of the right triangle and the leg of the right triangle along the X direction is an acute angle α, where a leg of each right triangle is located on the light transmission layer 301, and for each right triangle, the leg thereof along the Z direction is disposed at a position away from the center of the microstructure film layer 30 in a direction perpendicular to the edge where the microstructure region 302 is located. It should be understood that the first microstructures 3022 are continuously arranged in stripes along the Y direction. The first microstructure 3022 and the light transmission layer 301 each include a transparent material, the light transmission layer 301 has a refractive index $n_1$, and the first microstructure 3022 has a refractive index $n_2$, and both $n_1$ and $n_2$ are greater than 1. In some implementations, the refractive index of a medium contacted by the inclined surface of the first microstructure 3022 (i.e., the surface of the first microstructure 3022 where the above-mentioned hypotenuse in the cross section is located) is smaller than $n_2$; for example, the medium may be air.

Referring to FIG. 4a, when the backlight is incident vertically in the Z direction, passes through the microstructure region 302 and the light transmission layer 301 successively, and finally is emitted from the microstructure film layer 30, the microstructure film layer 30 will refract the incident backlight at a relatively large angle, so that all the backlight passing through the microstructure region is deflected from the direction perpendicular to the edge where the microstructure region 302 is located and is refracted away from the center of the microstructure film layer 30. The deflection of the outgoing light can increase the optical path of the light when it enters the backlight film material layer 20, thereby exciting more red light and green light. When more red, green and blue light are mixed, the bluish edge of the backlight can be improved.

Figure 4B:
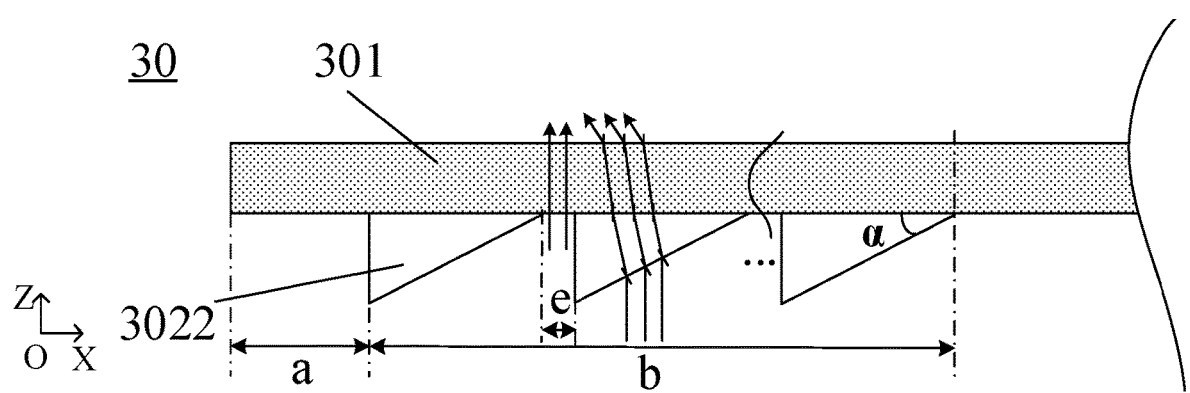
FIG. 4b is a schematic cross-sectional view of a microstructure film layer according to an embodiment of the present disclosure.

In some implementations, as shown in FIG. 4b, the first microstructures 3022 have cross sections of right triangles respectively, and are arranged in the X direction in the microstructure region 302 at intervals, and the interval distances between the first microstructures 3022 (i.e., the right triangles) each are equal to e. For each right triangle, the included angle between the hypotenuse of the right triangle and the leg of the right triangle along the X direction is an acute angle α, where a leg of each right triangle is located on the light transmission layer 301, and for each right triangle, the leg thereof along the Z direction is disposed at a position away from the center of the microstructure film layer 30 in the direction perpendicular to the edge where the microstructure region 302 is located. The materials of the first microstructure 3022 and the light transmission layer 301 each include a transparent material, the light transmission layer 301 has a refractive index $n_1$, and the first microstructure 3022 has a refractive index $n_2$, and $n_1$ and $n_2$ each are greater than 1. In some implementations, the refractive index of a medium contacted by the inclined surface of the first microstructure 3022 (i.e., the surface of the first microstructure 3022 where the above-mentioned hypotenuse in the cross section is located) is smaller than $n_2$; for example, the medium may be air. At the intervals between the first microstructures 3022, the backlight enters the light transmission layer 301 vertically in the Z direction, and is emitted from the side of the light transmission layer 301 close to the backlight film material layer 20 without being deflected, thus the optical path of the backlight entering the backlight film material layer 20 is not increased. By contrast, the backlight entering the first microstructures 3022 and modulated by the first microstructure 3022 is deflected when entering the backlight film material layer 20, and the optical path thereof is increased, thereby exciting more red light and green light. By adjusting the interval distance e, the ratio of the backlight deflected and the backlight not deflected when the backlight entering the backlight film material layer 20 can be controlled, thereby controlling the proportion of excited red light and green light, and adjusting the chromaticity at the edge of the backlight more accurately. It should be understood that the specific value of the interval distance e may be set as required, as long as the chromaticity at the edge of the backlight can be controlled to be within an acceptable range.

Figure 4C:
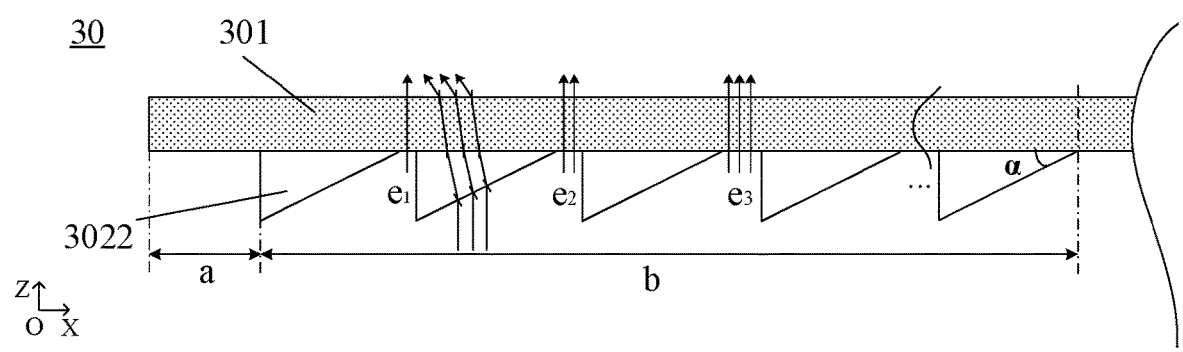
FIG. 4c is a schematic cross-sectional view of a microstructure film layer according to an embodiment of the present disclosure.

In some implementations, as shown in FIG. 4c, the first microstructures 3022 have cross sections of right triangles respectively, and are arranged at intervals in the X direction in the microstructure region 302, and not all interval distances between the first microstructures 3022 (i.e., between the right triangles) are equal. Exemplarily, the intervals between k (k is not less than 2) identical first microstructures 3022, which are arranged along the positive direction of the X axis in the microstructure region 302, may be represented as $e_1, e_2, e_{k-1}$, where $e_1 < e_2 < \ldots < e_{k-1}$. In some implementations, $e_1, e_2, e_{k-1}$ are equal-difference sequences (i.e., differences between values of any adjacent ones of $e_1, e_2, \ldots e_{k-1}$ are equal to each other) and are gradually increased in value. For each right triangle, the included angle between the hypotenuse of the right triangle and the leg of the right triangle along the X direction is an acute angle α, where a leg of each right triangle is located on the light transmission layer 301, and for each right triangle, the leg thereof along the Z direction is disposed at a position away from the center of the microstructure film layer 30 in the direction perpendicular to the edge where the microstructure region 302 is located. The first microstructure 3022 and the light transmission layer 301 each include a transparent material, the light transmission layer 301 has a refractive index $n_1$, and the first microstructure 3022 has a refractive index $n_2$, and $n_1$ and $n_2$ each are greater than 1. In some implementations, the refractive index of a medium contacted by the inclined surface of the first microstructure 3022 (i.e., the surface of the first microstructure 3022 where the above-mentioned hypotenuse in the cross section is located) is smaller than $n_2$; for example, the medium may be air. It should be understood that, as approaching the edge position of the backlight gradually, the proportion of blue light is gradually increased in a gradual process. Therefore, by using the solution shown in FIG. 4c, the proportion of red light and green light can be gradually increased as approaching the edge position of the backlight gradually, so as to improve the problem of chromaticity shift caused by the gradual increase of the proportion of blue light, so that the chromaticity at the edge of the backlight is to be within an acceptable range. Compared with the solution shown in FIG. 4b, the solution shown in FIG. 4c results in more uniform chromaticity compensation, can more effectively improve the bluishness at the edge of the backlight, and thus improves the display effect of the display device.

Figure 5A:
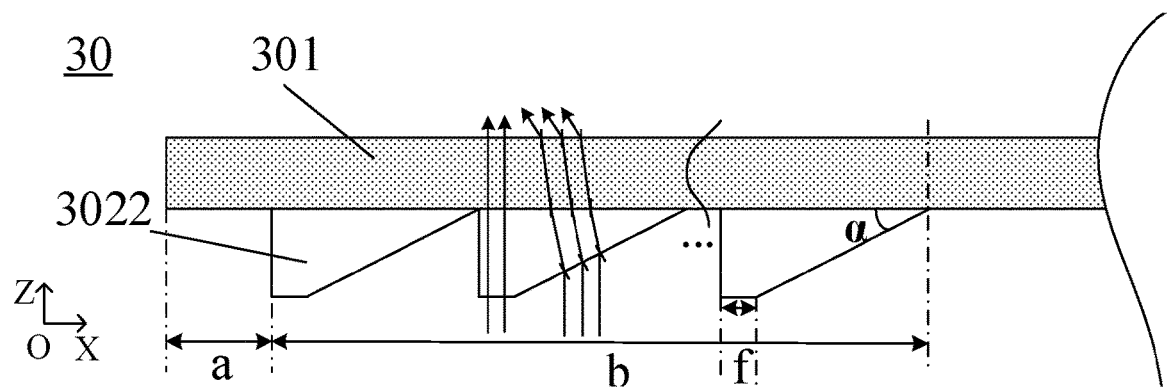
FIG. 5a is a schematic cross-sectional view of a microstructure film layer according to an embodiment of the present disclosure.

In some implementations, as shown in FIG. 5a, the first microstructures 3022 have cross sections of right trapezoids respectively, and are continuously arranged in the X direction in the microstructure region 302, and the cross sections of the first microstructures 3022 are identical. For each right trapezoid, the vertical waist side thereof along the Z direction is disposed at a position away from the center of the microstructure film layer 30 in a direction perpendicular to the edge where the microstructure region 302 is located, the longer base side thereof (e.g., the base side being longer than the other base side) is in contact with a surface of the light transmission layer 301 away from the backlight film material layer 20, and an angle between the oblique waist side and the longer base side thereof is an acute angle α. The first microstructure 3022 and the light transmission layer 301 each include a transparent material, the light transmission layer 301 has a refractive index $n_1$, and the first microstructure 3022 has a refractive index $n_2$, and $n_1$ and $n_2$ each are greater than 1. In some implementations, the refractive index of a medium contacted by the inclined surface of the first microstructure 3022 (i.e., the surface of the first microstructure 3022 where the above-mentioned oblique waist side in the cross section is located) is smaller than $n_2$; for example, the medium may be air. When the backlight incident in the Z direction enters from the shorter base side of the right trapezoid, the backlight is emitted after passing through the first microstructure 3022 and the light transmission layer 301, and the outgoing direction of the backlight is not deflected. When the backlight incident in the Z direction enters from the oblique waist side of the right trapezoid, the backlight is emitted after passing through the first microstructure 3022 and the light transmission layer 301, and the outgoing direction of the backlight is deflected, and in such case, the optical path of the backlight entering the backlight film material layer 20 is increased, and more red and green light can be excited. By controlling the length of the shorter base side of the cross section in the shape of right trapezoid and the included angle $\alpha$ between the oblique waist side and the longer base side of the cross section (i.e., in the shape of right trapezoid) of the first microstructure 3022, the ratio of the backlight deflected and the backlight not deflected when entering the backlight film material layer 20 can be controlled, thereby controlling the proportion of the red and green light excited, and controlling the chromaticity at the edge of the backlight more accurately.

Figure 5B:
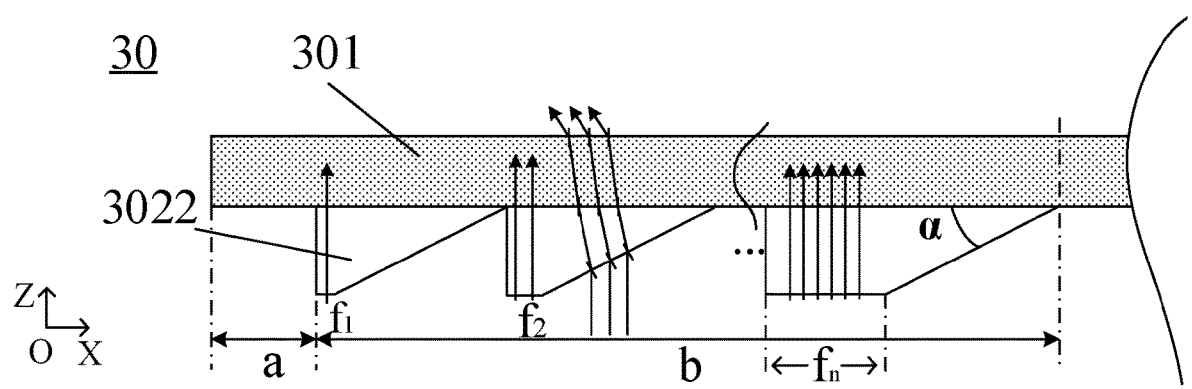
FIG. 5b is a schematic cross-sectional view of a microstructure film layer according to an embodiment of the present disclosure.

In some implementations, as shown in FIG. 5b, the first microstructures 3022 have cross sections of right trapezoids respectively, and are continuously arranged along the X direction in the microstructure region 302, and not all the right trapezoids are identical. Exemplarily, there are k first microstructures 3022 continuously arranged along the positive direction of the X axis in the microstructure region 302, and the lengths of the shorter base sides of the cross sections in shapes of right trapezoids may be represented as $f_1$, $f_2$, $f_{k-1}$, where $f_1 < f_2 < \ldots < f_{k-1}$, respectively. In some implementations, $f_1$, $f_2$, \ldots $f_{k-1}$ are equal-difference sequences (i.e., differences between values of any adjacent ones of $f_1$, $f_2$, \ldots $f_{k-1}$ are equal to each other) and are gradually increased in value. For each right trapezoid, the vertical waist side thereof along the Z direction is disposed at a position away from the center of the microstructure film layer 30 in a direction perpendicular to the edge where the microstructure region 302 is located, the longer base side thereof (i.e., the base side being longer than the other base side) is in contact with a surface of the light transmission layer 301 away from the backlight film material layer 20, and an included angle between the oblique waist side and the longer base side thereof is an acute angle $\alpha$. The first microstructure 3022 and the light transmission layer 301 each include a transparent material, the light transmission layer 301 has a refractive index $n_1$, and the first microstructure 3022 has a refractive index $n_2$, and $n_1$ and $n_2$ each are greater than 1. In some implementations, the refractive index of a medium contacted by the inclined surface of the first microstructure 3022 (i.e., the surface of the first microstructure 3022 where the above-mentioned oblique waist side in the cross section is located) is smaller than $n_2$; for example, the medium may be air. It should be understood that, as approaching the edge position of the backlight gradually, the proportion of blue light is gradually increased in a gradual process. Therefore, by using the solution shown in FIG. 5b, the proportion of red light and green light can be gradually increased as approaching the edge position of the backlight gradually, so as to improve the problem of chromaticity shift caused by the gradual increase of the proportion of blue light, so that the chromaticity at the edge of the backlight is to be within an acceptable range. Compared with the solution shown in FIG. 4a, the solution shown in FIG. 5b results in more uniform chromaticity compensation, can more effectively improve the bluishness at the edge of the backlight, and thus improves the display effect of the display device.

Figure 6:
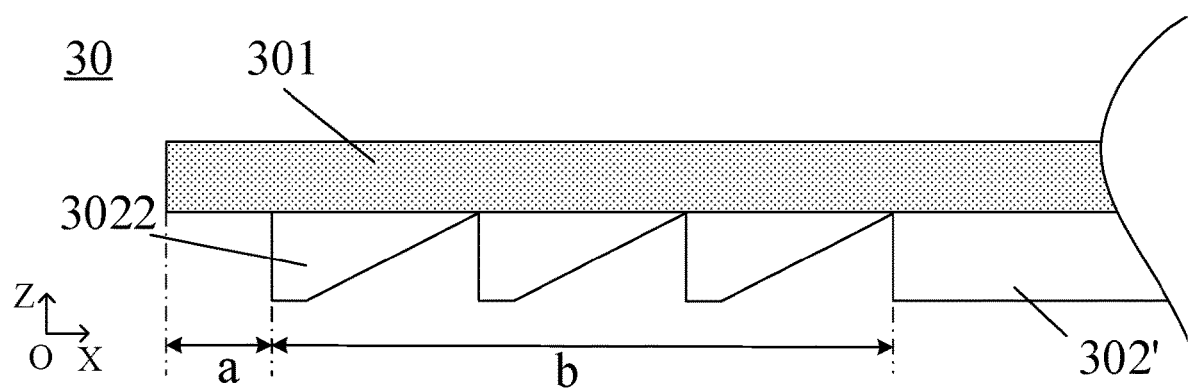
FIG. 6 is a schematic cross-sectional view of the structure shown in FIG. 3a taken along a direction of C→C'.

For corner positions of the microstructure film layer 30, for example, as shown in FIG. 6 which illustrates a schematic cross-sectional view taken along the direction of C → C' shown in FIG. 3a, the corner position is occupied by the microstructure region 302 arranged in the Y direction, and the shape and size of the cross section of the microstructure region 302 are the same as the shape and size of the cross section of the microstructure region 302 in the schematic cross-sectional view taken along the direction of A → A'. In FIG. 6, the microstructure region 302' is used to represent that it extends in a direction different from the direction in which the microstructure region 302 at the corner position extends. Although FIG. 6 illustrates that the corner in the cross section taken along the direction of C → C' is filled by the microstructure region 302 which extends in the Y direction, it should be understood that, the corner in the cross section taken along the direction of C → C' may also be filled by the microstructure region 302' instead of the microstructure region 302. The present disclosure does not specifically limit the filling mode of the four corners of the microstructure film layer 30, the microstructure region 302 extending in any direction may be used for filling the corner of the microstructure film layer 30.

Figure 7:
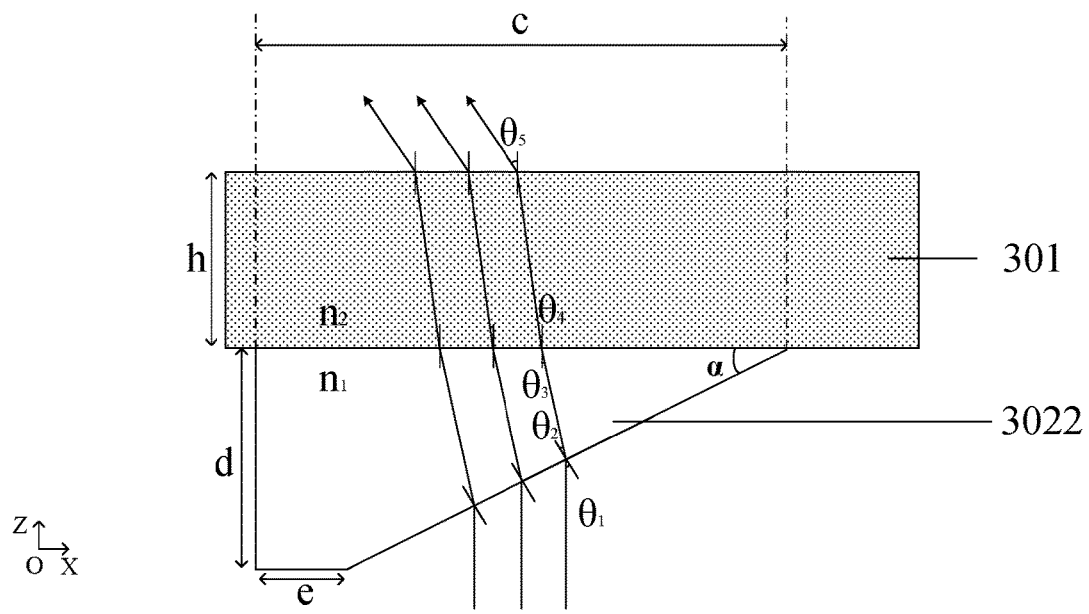

More specifically, for example, taking the schematic cross-sectional view of either of FIGS. 5a and 5b illustrating the cross sections of the first microstructures 3022 as an example, referring to FIG. 7, for each right trapezoid, the length of the longer base side, the length of the shorter base side, and the length of the vertical waist side are represented by c, e, and d, respectively, and the included angle between the oblique waist side and the longer base side is an acute angle $\alpha$. The refractive index of the first microstructure 3022 is $n_1$, the refractive index of the light transmission layer 301 is $n_2$, and the medium adjacent to the microstructure film layer 30 and on both sides of the microstructure film layer 30 along the light outgoing direction is air. $\theta_1$ is an incident angle at which the incident light enters the first microstructure 3022 (with respect to a normal direction of an incident surface that the incident light enters), $\theta_1 = \alpha$, and $\theta_2$ is a refraction angle at which the light is refracted in the first microstructure 3022 (with respect to a normal direction of a surface at which refraction of the light occurs), thus, $\sin \theta_1 / \sin \theta_2 = n_1$; $\theta_3$ is an incident angle at which the incident light enters the light transmission layer 301, $\theta_4$ is a refraction angle at which the light is refracted in the light transmission layer 301, $\sin \theta_3 / \sin \theta_4 = n_2 / n_1$; $\theta_5$ is a deflection angle of the light (i.e., an angle that the light has been deflected by), $\sin \theta_5 / \sin \theta_4 = n_2$; in addition, from the geometric relationship, it can be obtained that $\theta_2 + \theta_3 = \alpha$, thus, the relationship between the deflection angle $\theta_5$ of the light and $\alpha$, $n_1$ and $n_2$ can be obtained as:

$$\theta_5 = \arcsin\left(n_1 * \left(\sin\alpha * \sqrt{1 - \frac{\sin^2\alpha}{n_1^2}} - \cos\alpha * \sin\alpha / n_1\right)\right).$$

For the structures shown in FIGS. 4a to 4c and FIGS. 5a to 5b, for example, it may be configured that $\alpha=45°$ and $n_1=1.49$, so that the deflection angle $\theta_5$ of the light is to be equal to about 26°.

For the structures shown in FIGS. 4a to 4c and FIGS. 5a to 5b, for example, a thickness h of the light transmission layer 301 may range from about 0.03 mm to about 0.5 mm.

For example, for the structures shown in FIGS. 4a to 4c, in order to avoid being visible to naked eyes, the length of the leg of the cross section, in the shape of right triangle, along the X direction is less than or equal to about 70 μm, and the length of the leg of the cross section, in the shape of right triangle, along the Z direction is less than or equal to about 17 μm.

For example, for the structures shown in FIGS. 5a to 5b, in order to avoid being visible to naked eyes, the length c (i.e., the length of the longer base side) of the cross section of the microstructure, in the shape of right trapezoid, is not greater than about 70 μm, and the length d (i.e., the length of the vertical waist side) of the cross section of the microstructure, in the shape of right trapezoid, is not greater than about 17 μm.

In some implementations, the material of the light transmission layer 301 is any one of a transparent high molecular polymer (such as polyethylene terephthalate (PET)), an amorphous inorganic non-metallic material, or silicon dioxide; the material of the microstructure region 302 and/or the material of a microstructure support region 303 (described below) may be any one of a transparent high molecular polymer (such as PET), an amorphous inorganic non-metallic material, or silicon dioxide, or may be a product formed by photo-curing photosensitive resin. In some implementations, the material of the light transmission layer 301 and the material of the microstructure region 302 and/or the material of the microstructure support region 303 are the same, and in such case, $n_1=n_2$. In some implementations, the material of the microstructure region 302 and/or the material of the microstructure support region 303 each may be ultraviolet photosensitive resin. In some implementations, the ultraviolet photosensitive resin is acrylic resin.

Figure 8A:
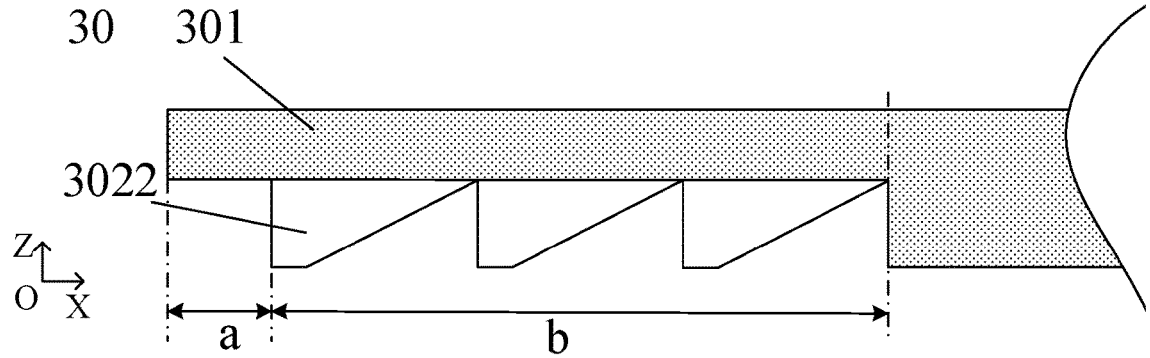
FIG. 8a is a schematic cross-sectional view of a microstructure film layer according to an embodiment of the present disclosure.
Figure 8B:
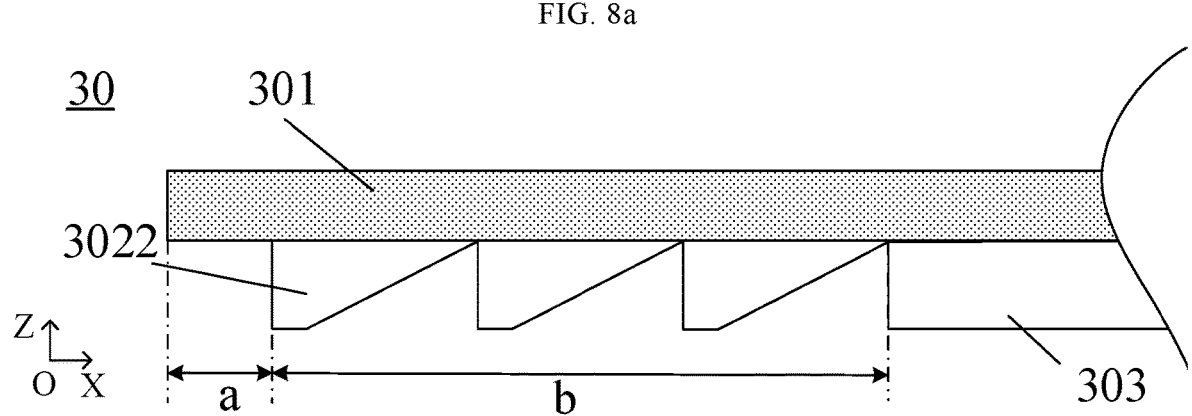
FIG. 8b is a schematic cross-sectional view of a microstructure film layer according to an embodiment of the present disclosure.

In some implementations, referring to FIG. 8a, the light transmission layer 301 has a thickness $h_1$ in an edge region thereof and has a thickness $h_2$ in other regions thereof, where the edge region is defined as the regions with the width a and the width b at the edge of the light transmission layer 301, $h_1 < h_2$ and the difference between $h_2$ and $h_1$ is the thickness (i.e., size in the Z direction) of the microstructure region 302. The solution of the present disclosure can make the lower surface of the microstructure film layer 30 more flat, and when the microstructure film layer 30 is provided in the backlight assembly 1, it will not be deformed due to the microstructure region 302 at the lower surface thereof, and the display effect will not be affected. In some implementations, referring to FIG. 8b, the microstructure support region 303 may be further provided in other regions, and the material and thickness of the microstructure support region 303 are the same as those of the microstructure region 302, respectively. Compared with the solution shown in FIG. 6, the solution shown in FIG. 7 is easier to be implemented in terms of process, since the microstructure support region 303 and the microstructure region 302 can be prepared in a same layer.

Figure 9A:
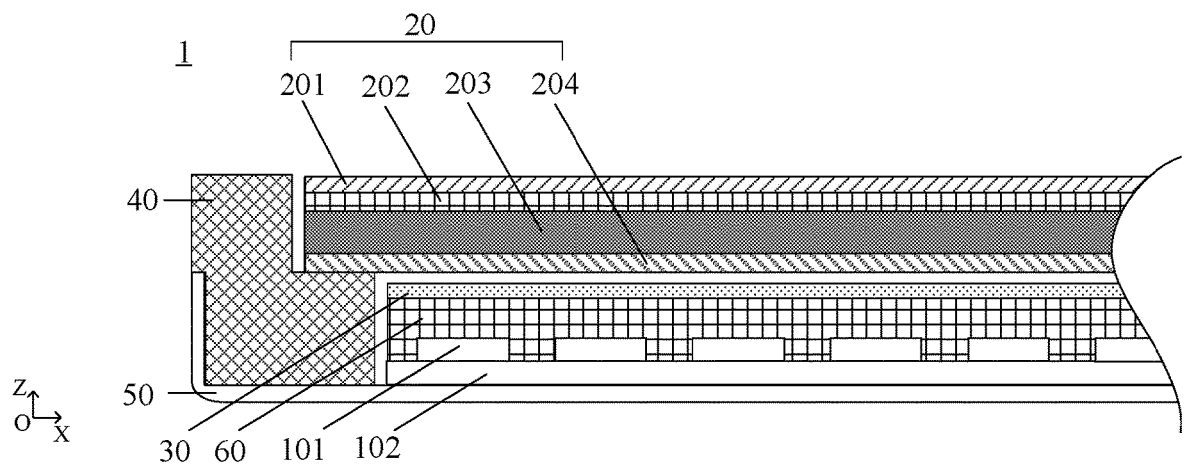
FIG. 9a is a schematic cross-sectional view of a backlight assembly according to an embodiment of the present disclosure.

In some implementations, referring to FIG. 9a, the backlight film material layer 20 includes a red-and-green light reflection film layer 204, a quantum dot layer 203, a diffusion film layer 202, and a prism film layer 201, which are provided in sequence along the light outgoing direction. The quantum dot layer 203 contains red quantum dots and green quantum dots, which can be excited by the blue light in the backlight to emit red fluorescence and green fluorescence, respectively. The red-and-green light reflection film layer 204 is configured to reflect the red light and green light emitted by the quantum dots, so that the red light and green light are emitted toward the light outgoing direction of the backlight assembly 1, and has no effect on the transmission of blue light. The diffusion film layer 202 is configured to diffuse the outgoing light so that the outgoing backlight is more uniform, and, it can also shield some possible defects of the backlight; the prism film layer 201 is configured to converge the outgoing light and improve the brightness of forward light from the backlight. In some implementations, the backlight assembly 1 further includes a transparent adhesive layer 60 located on a side of the circuit substrate 102 where the blue light chips 101 are provided. The transparent adhesive layer 60 covers all the blue light chips 101, and has functions of planarization and protecting the blue light chips 101. The adhesive layer 60 may be set to have a approximately flat surface, even if the flat surface has bumps or dents, each of the bumps or dents has a size not exceeding ±0.05 mm with respect to the flat surface. In some implementations, the microstructure film layer 30 is provided on a side of the transparent adhesive layer 60 away from the direct-type light source substrate 10. In some implementations, the backlight assembly 1 further includes a frame 40 and a back panel 50. The frame 40 and the back panel 50 together enclose the direct-type light source substrate 10, the backlight film material layer 20, and the microstructure film layer 30, so as to protect the direct-type light source substrate 10, the backlight film material layer 20, the microstructure film layer 30, and other internal structures.

Figure 9B:
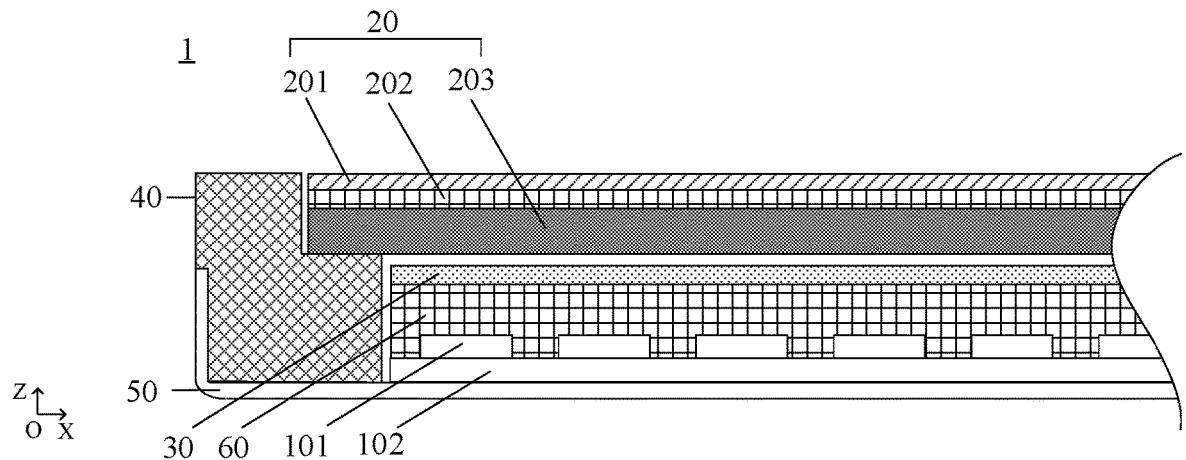
FIG. 9b is a schematic cross-sectional view of a backlight assembly according to an embodiment of the present disclosure.
Figure 10:
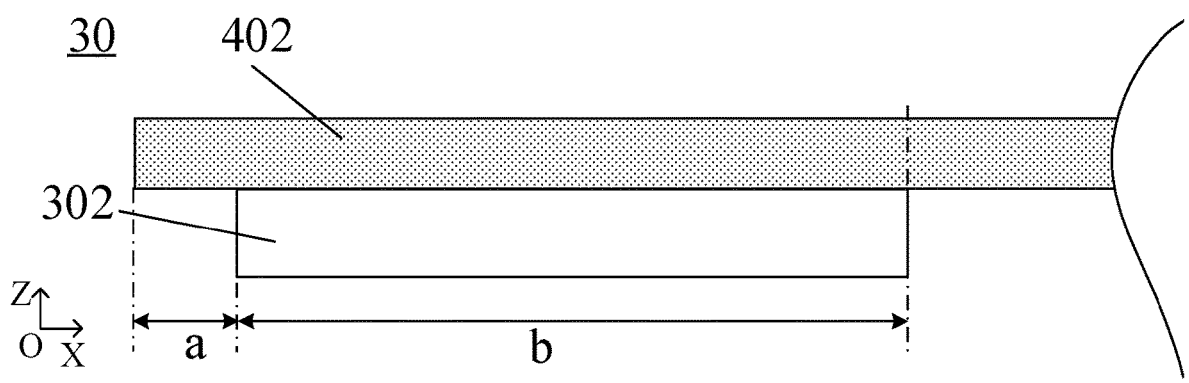
FIG. 10 is a schematic cross-sectional view of the structure shown in FIG. 3a taken along the direction of A→A' according to an embodiment of the present disclosure.

In some implementations, referring to FIG. 9b, the backlight film material layer 20 includes a quantum dot layer 203, a diffusion film layer 202, and a prism film layer 201 which are provided in sequence along the light outgoing direction, and a red-and-green light reflection film layer is provided in the microstructure film layer 30. Specifically, FIG. 10 shows a schematic cross-sectional view of the microstructure film layer 30 taken along the direction of A-A' shown in FIG. 3a, which is different from that shown in FIG. 3b in that, in FIG. 10, a red-and-green light reflection film layer 402 is used instead of the light transmission layer 301. The red-and-green light reflection film layer 402 has no effect on the transmission of blue light, and can cooperate with the microstructure area 302 to realize controlling the outgoing angle of all or part of the backlight passing through the microstructure region 302 at the edge position. Further, the red-and-green light reflection film layer 402 reflects the red light and green light emitted by the quantum dots in the backlight film material layer 20, so that the red light and the green light are emitted along the light outgoing direction of the backlight assembly 1. Replacing the light transmission layer 301 with the red-and-green light reflection film layer 402 can reduce the number of film layers provided in the backlight assembly 1, can reduce the thickness of the backlight assembly 1, and reduce the difficulty and complexity of the process for preparing the backlight assembly 1.

Figure 11A:
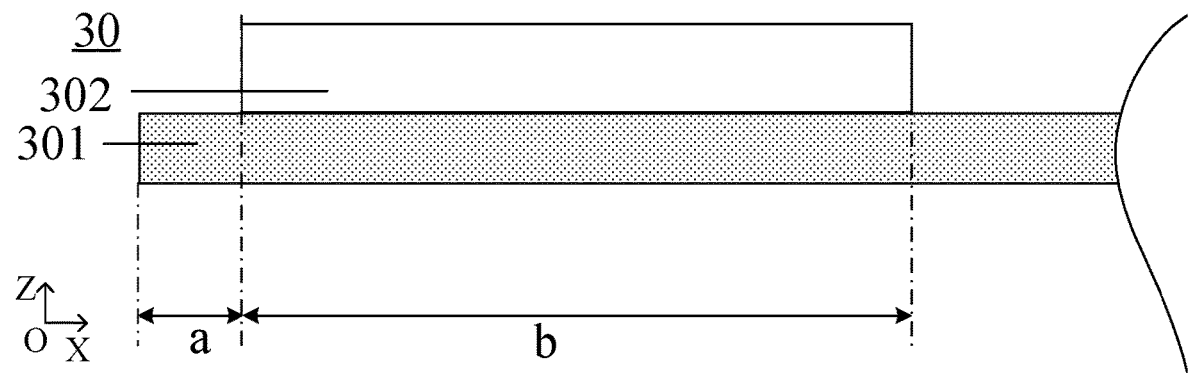
FIG. 11a is a schematic cross-sectional view of the structure shown in FIG. 3a taken along the direction of A→A' according to an embodiment of the present disclosure.
Figure 11B:
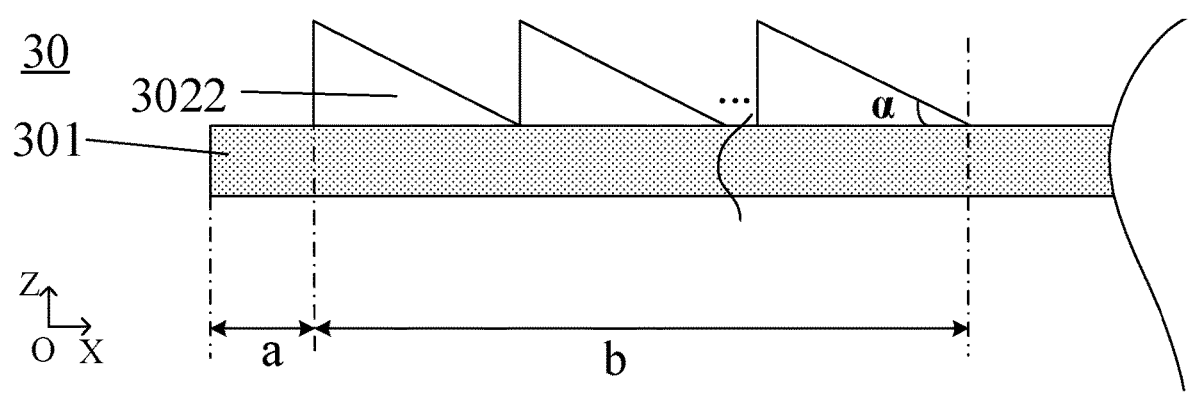
FIG. 11b is a schematic cross-sectional view of a microstructure film layer according to an embodiment of the present disclosure.

In some implementations, referring to FIG. 11a, the microstructure region 302 may be provided on the side of the light transmission layer 301 close to the backlight film material layer 20. In such case, the cross section of the specific structure of the microstructure region 302 taken along the direction of A→A' may be obtained by performing axisymmetric transformation on the cross section of the microstructure region 302 shown in any one of FIGS. 4a, 4b, 4c, 5a, and 5b, with a plane where a center of the light transmission layer 301 in thickness is located as the symmetry axis, the plane where the center of the light transmission layer 301 in thickness is located is in parallel to the plane where the light transmission layer 301 is located. In addition, the refractive index of a medium contacted by the inclined surface of the first microstructure 3022 (i.e., the surface of the first microstructure 3022 where the above-mentioned hypotenuse or oblique waist side in the cross section is located) is smaller than $n_2$, for example, the medium may be air. For example, FIG. 11b shows a schematic cross-sectional view taken along the direction of A → A', which is obtained by performing the above transformation on that shown in FIG. 4a. When the backlight enters the light transmission layer 301 and the first microstructure 3022 along the Z direction, the propagation direction of the backlight is not deflected. When the backlight is emitted from the hypotenuse of the right triangle, since the refractive index of the medium in contact with the first microstructure 3022 at the hypotenuse is smaller than the refractive index of the first microstructure 3022, all the backlight passing through the microstructure region is deflected from the direction perpendicular to the edge of the microstructure region and refracted away from the center of the microstructure film layer. Similarly, for the structure shown in any of FIGS. 4b, 4c, 5a, and 5b, part of the backlight passing through the microstructure region is deflected from the direction perpendicular to the edge of the microstructure region and refracted away from the center of the microstructure film layer. Therefore, when the backlight with the outgoing angle being changed passes through the backlight film material layer, the optical path thereof is increased, and more red light and green light are excited, which solves the problem of uneven chromaticity of bluish edges of the backlight during full screen displaying. Those skilled in the art should understand that, for those shown in FIGS. 8a, 8b and 10, axisymmetric transformation can be similarly performed thereon to obtain implementations in which the microstructure region 302 is disposed on the side of the light transmission layer 301 (or the red-and-green light reflection film layer 402) close to the backlight film material layer 20.

In the present disclosure, the backlight assembly includes the direct-type light source substrate, the microstructure film layer and the backlight film material layer; the backlight film material layer is located on the light outgoing side of the direct-type light source substrate, and the microstructure film layer is disposed between the direct-type light source substrate and the backlight film material layer; the microstructure film layer includes the light transmission layer and the microstructure region; the microstructure region is disposed at the edge position of the microstructure film layer. In the present disclosure, the combination of the microstructure region and the light transmission layer can change, at the edge position, an outgoing angle of all or part of backlight passing through the microstructure region, so that all or part of the backlight passing through the microstructure region is deflected from the direction perpendicular to the edge where the microstructure region is located and is refracted away from a center of the microstructure film layer, thereby the optical path of the backlight with the changed outgoing angle when passing through the backlight film material layer is increased, more red light and green light are excited, and thus solving the problem of uneven chromaticity of a bluish edge of the backlight during full screen displaying.

An embodiment of the present disclosure further discloses a display device including the aforementioned backlight assembly.

In the present disclosure, the backlight assembly in the display device includes the direct-type light source substrate, the microstructure film layer and the backlight film material layer; the backlight film material layer is located on the light outgoing side of the direct-type light source substrate, and the microstructure film layer is disposed between the direct-type light source substrate and the backlight film material layer; the microstructure film layer includes the light transmission layer and the microstructure region; the microstructure region is disposed at the edge position of the microstructure film layer. In the present disclosure, the combination of the microstructure region and the light transmission layer can change, at the edge position, an outgoing angle of all or part of backlight passing through the microstructure region, so that all or part of the backlight passing through the microstructure region is deflected from the direction perpendicular to the edge where the microstructure region is located and is refracted away from a center of the microstructure film layer, thereby the optical path of the backlight with the changed outgoing angle when passing through the backlight film material layer is increased, more red light and green light are excited, thus solving the problem of uneven chromaticity of a bluish edge of the backlight during full screen displaying, and the display effect of the display device is improved.

An embodiment of the present disclosure further provides a method for manufacturing a microstructure film layer.

Figure 12:
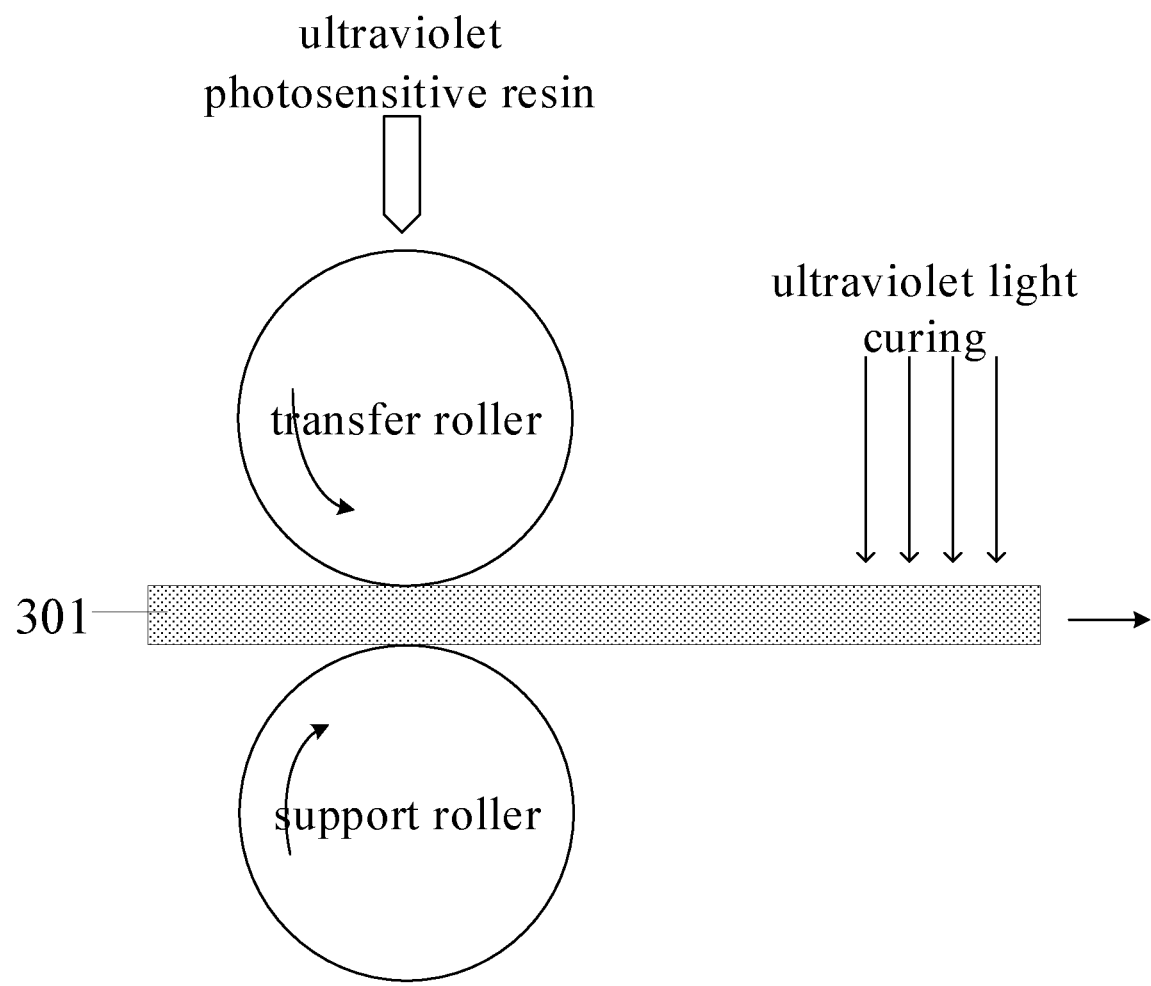
FIG. 12 is a schematic diagram illustrating a method for manufacturing a microstructure film layer according to an embodiment of the present disclosure.

Referring to FIG. 12, the light transmission layer 301 is subject to a roller transfer process and an ultraviolet light curing process in sequence. A designed trapezoidal structure groove is carved on a transfer roller, and liquid ultraviolet photosensitive resin is dropped into the groove. When adhesive force between the ultraviolet photosensitive resin and the light transmission layer is greater than that between the ultraviolet photosensitive resin and the transfer roller, the ultraviolet photosensitive resin is transferred to the surface of base material (e.g., the surface of the light transmission layer) in trapezoidal structures as the transfer roller rotates. Subsequently, in the ultraviolet light curing process, the ultraviolet photosensitive resin is cured to form the microstructure region 302 and/or the microstructure support region 303. In some implementations, during manufacturing the microstructure film layer, the light transmission layer 301 may be replaced by the red-and-green light reflection film layer 402.

It should be understood that, the method for manufacturing the microstructure film layer disclosed in the present invention is only exemplary. According to properties of materials the light transmission layer 301 and the microstructure region 302, the method for manufacturing the microstructure film layer may be selected as required. Particularly, when the light transmission layer 301 and the microstructure region 302 have a same refractive index, they may be made of a same material. In such case, the microstructure region 302 and/or the microstructure support region 303 may be formed on the light transmission layer 301 by etching.

Those skilled in the art should know that the embodiments described in the specification are all exemplary embodiments, and the actions and structures involved are not necessarily required by the technical solution of the present disclosure.

The embodiments in this specification are described in a progressive manner, and each embodiment focuses on the differences from other embodiments, and the same and similar parts between the various embodiments may be referred to each other.

Finally, it should also be noted that, herein, relational terms such as first and second and so on are used only to distinguish one entity or operation from another, and do not necessarily require or imply that there is any such actual relationship or sequence between these entities or operations. Moreover, the terms "comprising", "including" or any other variation thereof are intended to encompass non-exclusive inclusion such that a process, method, product or device including a list of elements includes not only those elements, but also includes other elements not explicitly listed or that are inherent to such process, method, product or device. Without further limitation, an element qualified by the phrase "comprising a . . . " does not preclude the presence of additional identical elements in the process, method, product or device that includes the element.

The backlight assembly and the display device provided by the present disclosure have been introduced in detail above. The principles and implementations of the present disclosure are described by using specific examples herein. The description of the above embodiments are only used to help understand the method and the core concept of the present disclosure; meanwhile, according to the concept of the present invention, variations of the specific implementation and application scope may be made by those skilled in the art. In summary, the contents of this specification should not be construed as limitations of the present disclosure.

What is claimed is:

1. A backlight assembly, comprising:
a light source substrate, a microstructure film layer and a backlight film material layer;
wherein the backlight film material layer is located on a light outgoing side of the light source substrate, and contains red quantum dots and green quantum dots;
the microstructure film layer is provided between the light source substrate and the backlight film material layer, and comprises a light transmission layer and a microstructure region; the microstructure region is provided at an edge position of the microstructure film layer; the microstructure film layer is configured to change, at the edge position, an outgoing angle of all or part of backlight passing through the microstructure region, so that all or part of the backlight passing through the microstructure region is deflected from a direction perpendicular to an edge where the microstructure region is located and is refracted away from a center of the microstructure film layer.

2. The backlight assembly of claim 1, wherein the light source substrate is a direct-type light source substrate.

3. The backlight assembly of claim 2, wherein the direct-type light source substrate comprises a circuit substrate and blue light chips provided at intervals on the circuit substrate; orthographic projections of the blue light chips on a plane where the circuit substrate is located are all located within an orthographic projection of the microstructure film layer on the plane where the circuit substrate is located.

4. The backlight assembly of claim 3, wherein a cross section of the microstructure region in a direction perpendicular to an edge of the microstructure film layer comprises at least one right triangle; wherein a first leg of the right triangle is located on the light transmission layer, and a second leg of the right triangle is provided at a position away from the center of the microstructure film layer in the direction perpendicular to the edge where the microstructure region is located.

5. The backlight assembly of claim 4, wherein the at least one right triangle comprises two or more right triangles, and the right triangles are provided in contact with each other.

6. The backlight assembly of claim 4, wherein the at least one right triangle comprises two or more right triangles, and the right triangles are provided at equal intervals,
or, intervals between the right triangles are gradually increased in a direction from the edge to the center of the microstructure film layer.

7. The backlight assembly of claim 3, wherein a cross section of the microstructure region in a direction perpendicular to the edge of the microstructure film layer comprises at least one right trapezoid; wherein a longer base side of the right trapezoid is located on the light transmission layer, and a vertical waist side of the right trapezoid is provided at a position away from the center of the microstructure film layer in the direction perpendicular to the edge where the microstructure region is located.

8. The backlight assembly of claim 7, wherein the at least one right trapezoid comprises two or more right trapezoids, and the right trapezoids are provided in contact with each other; wherein shorter base sides of the right trapezoids have a same length.

9. The backlight assembly of claim 7, wherein the at least one right trapezoid comprises two or more right trapezoids, and the right trapezoids are provided in contact with each other; wherein lengths of shorter base sides of the right trapezoids are gradually increased in a direction from the edge to the center of the microstructure film layer.

10. The backlight assembly of claim 1, wherein the backlight film material layer comprises a red-and-green light reflection film layer and a quantum dot layer provided in sequence in a light outgoing direction; wherein, the quantum dot layer comprises red quantum dots and green quantum dots; the red-and-green light reflection film layer is configured to reflect red light and green light.

11. The backlight assembly of claim 1, wherein the red-and-green light reflection film layer also serves as the light transmission layer.

12. The backlight assembly of claim 1, wherein a material of the microstructure region includes ultraviolet photosensitive resin, and/or a material of the light transmission region includes polyethylene terephthalate.

13. A display device, comprising the backlight assembly of claim 1.

14. The backlight assembly of claim 2, wherein the backlight film material layer comprises a red-and-green light reflection film layer and a quantum dot layer provided in sequence in a light outgoing direction; wherein, the quantum dot layer comprises red quantum dots and green quantum dots; the red-and-green light reflection film layer is configured to reflect red light and green light.

15. The backlight assembly of claim 3, wherein the backlight film material layer comprises a red-and-green light reflection film layer and a quantum dot layer provided in sequence in a light outgoing direction; wherein, the quantum dot layer comprises red quantum dots and green quantum dots; the red-and-green light reflection film layer is configured to reflect red light and green light.

16. The backlight assembly of claim 4, wherein the backlight film material layer comprises a red-and-green light reflection film layer and a quantum dot layer provided in sequence in a light outgoing direction; wherein, the quantum dot layer comprises red quantum dots and green quantum dots; the red-and-green light reflection film layer is configured to reflect red light and green light.

17. The backlight assembly of claim 2, wherein the red-and-green light reflection film layer also serves as the light transmission layer.

18. The backlight assembly of claim 3, wherein the red-and-green light reflection film layer also serves as the light transmission layer.

19. The backlight assembly of claim 4, wherein the red-and-green light reflection film layer also serves as the light transmission layer.

20. The backlight assembly of claim 2, wherein a material of the microstructure region includes ultraviolet photosensitive resin, and/or a material of the light transmission region includes polyethylene terephthalate.

* * * * *